United States Patent

[11] 3,616,340

[72] Inventor Philip E. Lapat
 Sudbury, Mass.
[21] Appl. No. 841,629
[22] Filed July 14, 1969
[45] Patented Oct. 26, 1971
[73] Assignee Kennecott Copper Corporation
 New York, N.Y.

[54] REFINING OF LIQUID COPPER
 22 Claims, 1 Drawing Fig.
[52] U.S. Cl. .................................................. 204/140,
 204/64, 204/106, 204/129
[51] Int. Cl. ...................................................... C22d 3/14,
 C01b

[50] Field of Search............................................ 204/39,
 106–108, 128, 129, 59, 60, 140, 64; 75/76

[56] References Cited
 UNITED STATES PATENTS
 2,347,450 4/1944 Young........................ 204/64 R
 1,964,906 7/1934 Chandler et al. ............. 204/64 R
 502,431 8/1893 Eames........................... 204/64 R Primary Examiner—John H. Mack
Assistant Examiner—R. L. Andrews
Attorneys—John L. Sniado and Lowell H. McCarter ABSTRACT: A process for refining copper comprises removing anionic impurities by electrolytic or chemical reaction followed by removing the remaining impurities by contacting molten copper with a fluorine containing salt.

INVENTOR
Philip E. Lapot by Lowell H. McCarter
ATTORNEY

3,616,340

REFINING OF LIQUID COPPER

BACKGROUND OF THE INVENTION

Copper refining is conventionally practiced upon impure copper from three sources. These comprise (1) flotation concentrates, generally copper-iron sulfides, (2) "precipitate" copper obtained by cementation with scrap iron from aqueous solutions produced by leaching of mine waste dumps, and (3) secondary or scrap copper. Sources (1) and (2) pass through a well-established smelting and converting process, whose end product is an impure grade of metal known as "blister copper." Source (3) may enter the refining process directly, or it may first be smelted in a blast furnace, whose impure product metal is known as "black copper." Table I below gives analyses of a number of samples from various copper sources.

TABLE I.—ANALYSES OF CRUDE COPPERS

| | Weight percent | | | | | | | |
|---|---|---|---|---|---|---|---|---|
| | Blister coppers | | | | Black coppers | | | Misc. copper scrap |
| | 1 | 2 | 3 | 4 | 1 | 2 | 3 | 1 | 2 |
| O | .34 | 1.03 | .26 | .58 | | | | | |
| S | .062 | .014 | .069 | .069 | | | | | |
| Se | .030 | .030 | .030 | .020 | | | | | |
| Te | .0012 | .0008 | .040 | .0018 | | | | | |
| Ni | .032 | .035 | .16 | .031 | 1.27 | .64 | 3.77 | 1.0 | .1 |
| Fe | .0039 | .0062 | .0031 | .0068 | | | | | |
| Pb | .0005 | .27 | .010 | .0092 | .83 | .55 | .75 | 2.0 | .1 |
| Bi | .00025 | .00014 | .00048 | .00094 | .001 | .0015 | | | |
| As | .0027 | .19 | N.D. | .0094 | .12 | .12 | .22 | | |
| Sb | .0004 | .020 | N.D. | .0054 | .09 | .18 | .60 | 0.1 | |
| Sn | .00027 | .00021 | .0012 | .00086 | 1.85 | .70 | .10 | 1.0 | .05 |
| Zn | | | | | .40 | .35 | | 0.5 | |
| Cu | Balance | Balance | Balance | Balance | 91.1 | 94.8 | 94.1 | 92.0 | 97.5 |

TABLE II. Impurity Analyses of Copper Anodes

| | 1 | 2 | 3 | 4 |
|---|---|---|---|---|
| O | — | — | — | 0.17 |
| S | 0.007 | 0.0065 | 0.004 | 0.0033 |
| Se | 0.04 | 0.144 | 0.033 | 0.064 |
| Te | — | 0.027 | 0.013 | 0.016 |
| Ni | 0.14 | 0.017 | 0.037 | 0.044 |
| Fe | 0.05 | 0.0013 | 0.011 | 0.006 |
| Pb | 0.06 | 0.0004 | 0.038 | 0.012 |
| Bi | — | — | 0.002 | 0.003 |
| As | 0.08 | 0.0012 | 0.033 | 0.010 |
| Sb | 0.05 | 0.0001 | 0.020 | 0.010 |
| Zn | — | — | 0.003 | — |

Conventional refining is done by either Fire Refining or Electrolytic Refining.

Fire Refining comprises (1) transferring the crude liquid copper to a refining furnace (or melting it in that furnace should it arrive from the smelting process in solidified form), (2) oxidizing the molten metal by introduction of air through iron blowpipes, (3) frequently skimming slag from the surface of the bath, and (4) reducing or "poling" the metal which consists of inserting green hardwood poles into the molten metal bath that decompose into hydrocarbon gases and carbon. The refined copper is then ready for casting into desired shapes.

Fire refining is capable of removing substantially all of the sulfur, zinc, tin and iron, and partially removing several other impurities. Nickel, bismuth, selenium and tellurium, on the other hand, resist fire refining treatments almost completely.

The refining of a 300-ton charge of blister copper requires about 20 hours; charging time consumes 2 hours, melting and skimming 14 hours, oxidizing 1½ hours and reducing 2½ hours. Subsequent casting consumes 3½ hours, so that the entire process operates on a 24-hour cycle.

Electrolytic Refining is used only where the amount of precious metals or the character of the impurities present in the crude copper warrant this expensive refining method. The first process step is fire refining much as described above, except that the fire refining is carried only far enough to permit casting of economically acceptable anodes.

The second process step is casting anodes by tapping the metal in a continuous stream into a casting ladle and bringing molds to the pouring position under the ladle. The usual casting machine has from 16 to 28 copper molds oriented horizontally at the periphery of a wheel. Solidified anodes are mechanically or pneumatically raised for engagement of a tong under the anode lugs, and then transferred to cooling tanks. They are inspected, and trimmed where necessary with pneumatic tools for removal of edges and fins. Anodes typically have dimensions 36 inches wide × 39 inches long × 1¾ inches to 2 inches thick, and weigh between 500 and 800 pounds. Table II below gives some representative impurity analyses of copper anodes:

In the third process step, the anodes are suspended, along with pure cathode starting sheets, in electrolytic cells containing sulfuric acid and copper sulfate and copper is electrolytically transferred from anode to cathode over a period of 25 to 31 days. Impurities dissolve and are carried away in the recirculating electrolyte, or else fall to the bottom of the cells as solid particulate "anode mud" or "slimes." Electrolysis cannot be carried to completion because anodes do not dissolve uniformly; 10 to 20 percent of the anode becomes scrap which is recycled to the fire refining furnace. Additionally, about 1 percent of the anode is converted to "anode mud" or "slimes." This material is treated separately for recovery of Cu, Se, Te and the precious metals.

In a fourth process step, the cathodes are melted so that they may be cast into desired commercial shapes. Cathode melting should rationally be confined to bringing solid cathodes into the molten state under noncontaminating conditions with provision for elimination of the small amounts of sulfur and occluded gas which may be introduced with the charge. However, in reverberatory furnace practice, because of contamination from combustion gases and iron pickup from furnace pipe and rabbles, melting of cathodes requires essentially the same procedure as for fire-refining of impure copper. It is a batch process and every effort is made to perform the complete cycle in 24 hours.

OBJECTS OF INVENTION

It is the principal object of the present invention to provide an improved process for purifying copper. It is a further object of the present invention to provide a rapid, effective, and less costly method for purifying copper. Another object is to provide for removing substantial amounts of impurity elements including but not limited to oxygen, sulfur, selenium, tellurium, nickel, iron, lead, bismuth, arsenic, antimony, tin, phosphorus, zinc, cadmium and hydrogen. Yet another object of the present invention is to decrease the concentrations of the aforementioned impurities to very low levels, such that the product copper is equal or superior in purity to conventionally refined copper. The process of the present invention possesses several advantages over the prior art. One of these is that the process is conducted entirely at high temperature upon liquid copper, thereby eliminating the conventional unit operations of casting anodes and melting cathodes. Another advantage is that impurities are transferred out of the copper, rather than transferring copper away from the impurities as in conventional electrolytic refining. Since the quantity of impurities in crude copper is ordinarily about 1/100 of the total weight, the necessary residence time in the apparatus is therefore very much shortened, as from 32 days to a few minutes. Another advantage is that there is no anode scrap, which ordinarily constitutes 10-20 percent of the copper, and which must be recycled to the anode furnace because it is physically impractical to electrolyze an anode completely. Another advantage is that the refinery will be smaller and less costly to build, because the process of the present invention (1) has only two steps instead of the four steps of conventional electrolytic refining, and (2) the steps are much more rapid than conventional electrorefining. Another advantage is that operating costs will be smaller for the same two reasons.

Further objects and advantages of the present invention will appear hereinafter.

SUMMARY OF THE INVENTION

In accordance with the process of the present invention, it has now been found that the foregoing objects and advantages may be readily accomplished by an improved process for purifying copper by providing molten copper, removing the anion forming elements, i.e., oxygen, sulfur, selenium, and tellurium, by making the impure molten copper the cathode of an operating electrolytic cell containing a fused salt electrolyte and an insoluble anode, transferring the anion-free copper from the electrolytic cell to a chemical reactor, removing the metallic impurities by contacting the molten copper with one or more fluorine-containing compounds in a chemical reactor and removing the purified copper from the reactor.

Alternately, anion impurity elements can be removed by contacting impure copper with a molten salt or a mixture of molten salts containing dissolved reactive metal, in a chemical reactor, and removing the anion-free copper to the second process step.

Metallic impurity removal can also be accomplished by providing copper free of anionic impurity elements from a first process step, and making this copper the anode of an electrolytic cell containing a fused salt electrolyte bearing fluorine-containing compounds, and removing the purified copper from the electrolytic cell.

The anion impurity elements and the cation or metallic impurities may be simultaneously removed electrochemically in a two compartment electrolytic cell having a common receptacle or container for the impure liquid copper and separate compartments for two electrolytes.

PREFERRED EMBODIMENTS

First Step

Figure 1:
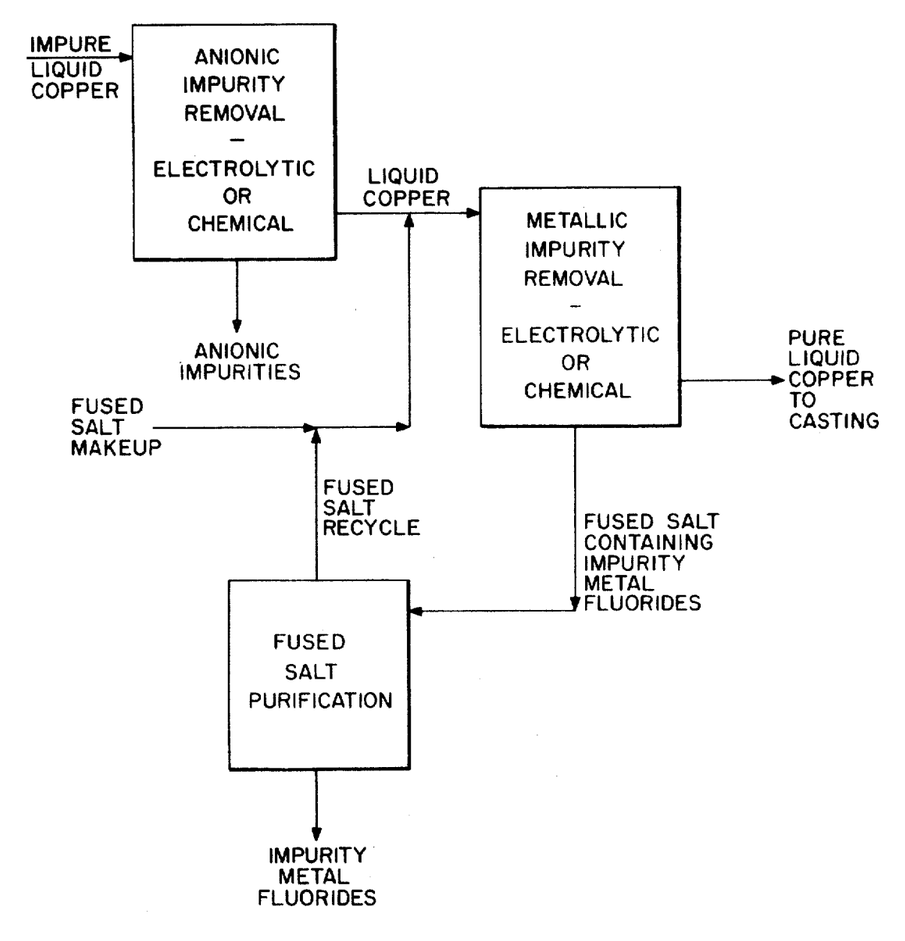
The accompanying drawing illustrates an idealized flow diagram for the process of the invention described herein.

In the first step of the process of this invention the anionic impurities are removed by electrolytic or chemical reaction. In the electrolytic method the impure liquid copper is made the cathode of an electrolytic cell containing a fused salt electrolyte and an insoluble anode. The electrolyte composition in cathodic refining is not highly critical, but is conveniently chosen from among the alkaline earth chlorides or fluorides or mixtures thereof because of their relatively low volatility near the melting point of copper, their chemical stability and their compatibility with graphite and certain other conventional oxide refractories. Alkali metal halides may also be added to the electrolyte composition. The alkali metal halides may comprise from about 0.3 weight percent to about 10 weight percent of the electrolyte. A number of alternate electrolytes might also be used providing they meet the above-mentioned criteria. In the first step the chalcogens or anionic impurity elements, for example, oxygen, sulfur, selenium, and tellurium are removed by an electrode reaction taking place at the cathode-electrolyte interface. The reaction may be represented as: $Cu_2S$ (dissolved in metal phase) $+2e^- \rightarrow 2Cu^0(1) +S^=$ (transferred to the salt phase) where oxygen, selenium and tellurium also act after the manner of sulfur.

The effectiveness of the removal of the anionic impurities is demonstrated in example I.

EXAMPLE I 487 grams of impure copper having an initial composition as shown in table III was melted along with 129 grams of anhydrous barium chloride electrolyte in an alumina crucible. The alumina crucible itself was contained in a large graphite crucible, a portion of whose sidewall was in contact with the electrolyte, and which served as the anode. The cathode current lead was a graphite rod extending down into the copper pool, and insulated from the electrolyte by an alumina sheath. The cell was maintained at 1,150° C. in an inert atmosphere, and electrolysis was performed at 3.3 volts with a cathode current density of 1.0 amps. per square centimeter. The average analysis of the impurities in the copper before and after electrolysis is shown in table III.

TABLE III

| | Weight Percent | |
|---|---|---|
| Impurity Element | Initial Composition | Average Composition after Electrolysis |
| O | 0.0006 | 0.0007 |
| S | 0.0341 | Not detected (<0.0002 wt. %) |
| Se | 0.026 | Not detected (<0.003 wt. %) |
| Te | 0.029 | Not detected (<0.0001 wt. %) |
| Ni | 0.056 | 0.053 |
| Fe | 0.033 | 0.022 |
| Pb | 0.23 | 0.20 |
| Bi | 0.056 | 0.002 |
| As | 0.039 | 0.013 |
| Sb | 0.049 | 0.011 |

Since the use of a graphite rod electrode results in oxygen removal by chemical as well as electrochemical reaction, this example is primarily a demonstration of S, Se, Te removal. Oxygen, however, has been found to behave similarly.

It is necessary in the case of oxygen removal experiments to determine, by comparison with control experiments in which the salt and metal are brought into contact under identical conditions (except that no electric current is passed), how much deoxidation is attributable to chemical reaction with carbon. The difference between this and the total deoxidation in a cathodic electrolysis experiment may be ascribed to electrolysis. Table IV contains examples of control experiments on all anionic impurities, and two electrolytic experiments which follow behavior of oxygen content:

TABLE IV

| Current passed | Element observed | Composition, weight percent | |
|---|---|---|---|
| | | Initial | Final |
| No | S | 0.58 | 0.46 |
| | Se | .92 | .78 |
| | Te | .84 | .66 |
| No | $O_2$ | 0.11 | .065 |
| Yes | $O_2$ | 0.11 | .001 |
| No | $O_2$ | 1.5 | .23 |
| Yes | $O_2$ | 1.5 | .001 |

An examination of tables III and IV reveals that the electrolysis completely removes the anionic impurities, oxygen, sulfur, selenium and tellurium, but has limited or no effect on the metallic impurities In order to prevent impurity buildup and thus give the process continuity, the effect of the electrolyte upon the anode reaction must be considered. If the electrolyte is chloride-based and the solubility of chalcogenides is slight, as depicted in example I above, the major anode product may be chlorine. The overall cell reaction becomes of the type:

$Cu_2S$ (in liquid Cu)+$BaCl_2 \rightarrow BaS+Cl_2(g)+2Cu$ (1)

and the electrolyte becomes fouled with oxygen, sulfur, selenium, and tellurium in the form of barium compounds. In some cases where the electrolyte is an inexpensive and impure salt to begin with, the electrolyte can be discarded when contaminated and sold for a noncritical use. I have calcium chloride especially in mind for this route.

A second method for dealing with the contaminated electrolyte depends upon the low solubility of the chalcogenide compounds in the alkaline earth chloride electrolytes. A portion of the electrolyte is continuously withdrawn from the electrolytic cell, cooled slightly to precipitate the chalcogenide compounds which are then mechanically separated by high-temperature filtration or its equivalent. The purified electrolyte is then reheated and returned to the electrolytic cell.

Another, and the preferred method is to prevent impurity buildup by using a fluoride based electrolyte in which chalcogenide compounds are significantly soluble. They may be soluble as copper compounds, impurity compounds, or compounds with the metal ions of the electrolyte, such as BaS, BaO, etc. Their presence may be due to simple solubility, to the formation of complex species or to reaction products.

The concept to be exploited is that the anode reaction may be advantageously confined to discharging chalcogenide-bearing ions because the decomposition potential for chalcogenide compounds in the electrolyte is generally smaller than that for equivalent halides, and especially fluorides.

Standard Decomposition Potentials for

Alkaline Earth Compounds at 1,100° C. (volts)

|  | Ba | Ca | Mg |
|---|---|---|---|
| Sulfide | 1.82 | 2.10 | 1.45 |
| Oxide | 2.19 | 2.53 | 2.33 |
| Chloride | 3.40 | 3.18 | 2.29 |
| Fluoride | 5.07 | 5.14 | 4.51 |

The difference in decomposition potentials is so large that thermodynamic activity effects due to complexing or dilution will not alter the deposition potentials of chalcogenides to a critical degree.

Thus, oxygen, sulfur, selenium and tellurium will be discharged at the anode and the cell is essentially self-cleaning, the overall cell reaction being of the type:

$Cu_2S$ (in liquid Cu)$\rightarrow 2Cu$(1)+½$S_2(g)$ (2)

A significant feature of the cathodic electrolysis is that when performed at constant current, the cell voltage is a function of the impurity concentration, and the cell voltage rises markedly as the end point of the reaction is approached. By limiting the available voltage through the cell, it is practicable to halt the reaction before the decomposition potential of the electrolyte is reached. In this way contamination of the purified copper by calcium, magnesium or other reactive metals derived from the electrolyte is avoided.

In the practical sense, a process conducted according to Reaction (1) is simply the desulfidation (or deoxidation, etc.) of copper by barium metal, and the use of the electrolytic cell may be viewed mainly as a convenient way to prepare barium metal and perform a reaction with it. Also, the barium metal will have been produced with less energy expenditure than if pure barium metal had been separately prepared.

The potential advantages of operating Cathodic Refining according to Reaction (2) rather than Reaction (1) include avoidance of problems of disposal of the chalcogenide compounds e.g., BaS, BaO, BaSe, BaTe), so that an electrolyte purification circuit is unnecessary; the opportunity to recover Se and Te by condensation of the anode gas, and elimination of chlorine gas recycling (as by using it to chlorinate the chalcogenide compounds and regenerate $BaCl_2$).

An advantage of using reaction (1) rather than Reaction (2) is that it can be performed in a chemical reactor without electrodes, as well as in an electrolytic cell. This is because many of the reactive metals are extensively or completely miscible with their halides, forming true liquid solutions at the temperatures where copper is molten. It thus becomes unnecessary for the liquid copper to remain in electrical contact with an electrode. Instead, the copper can be broken into small droplets and permitted to settle by gravity through a salt-filled vessel or contacting column, so that the reaction surface area of the copper droplets per unit area of plant floor space is much larger and the required plant size appropriately smaller than if an electrolytic cell is employed.

For example, if droplets of liquid copper 5 mm. in diameter are uniformly dispersed in a cylindrical salt-filled column 6 feet in diameter × 8 feet high, and the distance between droplets is 2 cm., the total surface area presented by the droplets is 904 ft.² If the column with ancillary equipment occupies a floor space 8 ft.× 8 ft., then there are 14.1 ft.² of reaction interface per ft² of plant floor space.

This figure is compared below with electrode areas typically encountered in existing commercial electrolytic processes:

| Application | Electrode position | Spacing, in. | Cathodes per cell | Cathode area, ft.² per ft.² of plant floor space |
|---|---|---|---|---|
| 1. Aqueous electrorefining of copper. | Vertical | 4 | 40 | 16 |
| 2. Aluminum electrowinning. | Horizontal | | 1 | ≈0.2 |
| 3. Chemical refining of Cu in the salt column described above. | None  | | | 14 |

It is seen that a high-temperature electrolytic cell having a single liquid pool electrode, horizontally oriented, has an inherently small electrode area per unit area of plant floor space, and thus may not minimize the plant size or its capital cost as effectively. Stacking of liquid pool electrodes is possible, to achieve a denser configuration of electrode surfaces as in aqueous electrolysis with vertical, solid electrodes; but this obviously requires more sophisticated construction which may offset the capital cost savings for which it is responsible.

Two further advantages of the chemical reactor version of the anion removal process derive from the fact that in this version the production of reactive metal (such as Ca, Ba, Mg, Na, etc.) dissolved in its halide salt is distinct and separate from its utilization in refining. Therefore (1) the reactive metal may be purchased instead of manufactured by the copper refinery, and (2) the optimal values of process parameters for manufacturing reactive metal, should the copper refinery choose to undertake it, will in general be different from those prevailing in the copper refining operation; separation of the two functions may therefore permit each to be performed under its most favorable circumstances.

In the removal of chalcogenide impurities by chemical reaction as described above, reaction products accumulate in the molten salt. In general their solubilities in the molten salt are believed to be quite limited, and they will be precipitated. The densities of compounds of reactive metals with chalcogenide elements in general lie between that of the molten salt and that of liquid copper. The solid compounds will therefore be trapped by gravity just above the interface between the metal and salt layers and can be removed from the system by gravity through a separate taphole located near the interface. The solid compounds will be admixed with salt. It may or may not be useful to separate the admixed salt, depending on whether or not the Se, Te and salt are to be recovered.

In judging the merit of the chemical reactor method for anion removal as heretofore described, a comparison naturally arises with conventional deoxidation processes wherein a reactive metal such as lithium or calcium is added directly to molten copper as a deoxidizer. The use of a solution of reactive metal dissolved in its halide is advantageous in that it provides a physical contacting process of the reagent with the copper which will be more uniform, controllable, safe and efficient than one employing reactive metal alone.

Second Step

In the second step of the process of this invention the remaining base impurity elements such as nickel, iron, lead, bismuth, arsenic, antimony, tin, zinc, cadmium, and phosphorus are removed by subjecting the molten copper either to a chemical refining reaction or to an electrochemical refining reaction in which a copper fluoride equivalent is the reactive substance employed.

y The following definitions will aid in the understanding of the invention as described hereinafter in the specification and in the interpretation of the appended claims.

The term "$CuF_x$" is defined for the purposes of this application as a molten solution of stoichiometric cupric fluoride, or $CuF_2$, which has been saturated with, or is in chemical equilibrium with, molten copper metal.

A measure of the ability of $CuF_x$ to perform fluorinating reactions is defined by its free energy of dissociation; which is the free energy change of the reaction:

$$(2/x)CuF_x \rightleftharpoons (2/x)Cu+F_2(g) \quad (3)$$

This may be more $CuF_2$stated by considering the dissociation reaction to be $$CuF_2 \rightleftharpoons Cu+F_2 \quad (4)$$

for which the standard free energy change is approximately known, and accounting for the stoichiometric difference between $CuF_x$ and $CuF_2$ by means of an activity term which uses $CuF_2$ as a standard state:

$$\Delta G_{(4)} = \Delta G°_{(4)} + RT\ln\frac{(a_{Cu})(p_{F_2})}{(a_{CuF_2})} \text{ calories.}$$

where $\Delta G$ is the Gibbs free energy change, and $a_{Cu}$ and $a_{CuF}$ denotes activities at saturation.

The term "fluorine potential," or $p_{F_2}$, is another measure of the ability of $CuF_x$ to perform fluorinating reactions. It is defined for the purposes of this application as the partial pressure of fluorine gas produced as a thermodynamic consequence of a chemical reaction equilibrium. For example, in a system at a defined temperature, containing $CuF_x$ and Cu in much larger quantity than all other reactive substances, such as impurity metals, the fluorine potential is essentially fixed by the presence of the major constituents, i.e., copper and $CuF_x$. It is defined by the equilibrium constant for reaction (3):

$$K_{(3)} = \frac{(a_{Cu})^{\frac{2}{x}}(p_{F_2})}{(a_{CuF_x})^{\frac{2}{x}}}$$

In this example $a_{Cu}$ and $a_{CuF}$ are not expected to vary significantly from unity, so that $K_{(3)} \approx p_{F_2}$ atm.

The term "copper fluoride equivalent" is defined for the purposes of the application not simply as stoichiometric cupric fluoride having the formula $CuF_2$, but more broadly as any product or mixture of products having an ability to perform fluorinating reactions upon liquid copper and the impurities contained therein which is controlled or limited by the thermochemical properties of molten $CuF_x$. Thus "copper fluoride equivalent" is any substance which upon contact with liquid copper provides a fluorine potential $P_{F_2}$ at least as great as does $CuF_x$. Stated another way, copper fluoride equivalent is any fluorine-bearing compound that is thermodynamically less stable than $CuF_x$ and consequently will act as a fluorinating agent for liquid copper and the impurity elements therein. Thus, elemental fluorine gas introduced into molten copper in limited or small quantity, relative to the amount of copper, reacts to form $CuF_x$ and is therefore termed "copper fluoride equivalent" as defined above.

Similarly, elemental fluorine gas introduced into a molten fluoride salt solution which contains a nonstoichiometric fluorine compound such as $CuF_x$, or a stoichiometric fluorine compound capable of accepting more fluorine to become a stoichiometric fluorine compound of higher valence, which is in contact with molten copper, the quantity of such fluorine gas being small or limited relative to the amount of molten copper, reacts with the nonstoichiometric fluorine compound or stoichiometric fluorine compound capable of accepting more fluorine to become a stoichiometric fluorine compound of higher valence in the salt to form $CuF_y$ where $x<y\leq 2$. $CuF_y$ in turn reacts with molten copper to form more $CuF_x$. The process is thus an indirect fluorination of copper via the salt phase termed "copper fluoride equivalent" as defined above.

Similarly, a high-valency fluorine compound which readily gives up a part of its fluorine content to molten copper, reverting in the process to a fluoride compound of lower valency, is termed "copper fluoride equivalent." An example is antimony pentafluoride, which may react according to:

$$(x/2)SbF_5(g)+Cu(l)\rightleftharpoons(x/2)SbF_3(g)+CuF_x(l)$$

Stannic Fluoride ($SnF_4$) is another example of a "copper fluoride equivalent." Stannic fluoride readily gives up part of its fluorine under the conditions of refining liquid copper to become stannous fluoride ($SnF_2$). Stannic fluoride is particularly adaptable to the process of this invention since it is a solid at room temperature, and yet sufficiently volatile at liquid copper temperatures so that it does not remain dissolved in the molten copper or the molten salt.

The majority of fluorine containing compounds are not termed "copper fluoride equivalent" because they are thermodynamically more stable than $CuF_x$ and cannot act as fluorinating agents for copper.

Another method of defining "copper fluoride" might have taken the specific term "cuprous fluoride, or CuF," into account and described the composition $CuF_x$ in terms of a mixture of $CuF_2+CuF$, or $CuF+Cu$, depending on the numerical value of $x$. There is however no good reason at the present time to invoke this additional complication in nomenclature, since the neutral compound CuF has not yet been characterized, or even proved to exist, either in gaseous or condensed form, at any temperature. Nevertheless, the definition of $CuF_x$ which has been adopted as an adequate formalism for purposes of this application should not be construed to mean that CuF does or does not exist, or that CuF species do or do not participate in the process of the present invention.

Cupric hydroxy fluoride [Cu(OH)F] is thought to be capable of approaching the performance I have observed with the copper fluoride equivalents as described herein. It is believed that under certain process conditions the use of cupric hydroxyfluoride could be considered an adequate substitute for $CuF_x$.

Utilization of a copper fluoride equivalent to refine molten copper by chemical reaction may be brought about in any of a number of ways.

1. Copper fluoride as anhydrous $CuF_2$ may be brought into direct contact with molten copper in the chemical reactor.

2. Copper fluoride may be prepared by reacting or burning elemental fluorine gas and anion-free impure copper in a torch or high-temperature reactor. The reaction or combustion products—copper fluoride equivalent—are then brought into contact with molten copper in the chemical reaction vessel.

3. Carbon and fluorine gas may be reacted as by contacting fluorine gas with charcoal. The reaction gases comprising principally $CF_4$, $C_2F_6$, $C_3F_8$ and $C_4F_{10}$ are then passed through the molten copper where the gases decompose and the fluorine combines with copper to form the copper fluoride equivalent.

4. A portion of the reaction products of (3) above comprise cyclic fluorocarbon compounds which are liquid at room temperature, such as Cyclo-$C_5F_{10}$, Cyclo-$C_6F_{12}$ and Cyclo-$C_7F_{14}$. This liquid mixture may be vaporized by heating, and then passed through the molten copper where the vapors decompose and the fluorine combines with copper to form the copper fluoride equivalent.

5. A copper fluoride equivalent such as antimony pentafluoride or stannic fluoride may be introduced into the molten copper in any convenient manner. This procedure is especially suitable because antimony pentafluoride, antimony trifluoride, stannic fluoride and stannous fluoride are all volatile enough so that they evaporate both from the molten copper and salt phase, and do not accumulate. Antimony pentafluoride is a liquid and stannic fluoride is a solid at room temperature and can be conveniently handled.

6. It has been found that the copper fluoride equivalent need not be used at full strength, but may be dissolved in various other stable salt solvents such as alkaline earth fluoride eutectic mixtures. In some cases a salt containing very little dissolved copper fluoride equivalent may be adequate, depending upon which impurities are to be removed and to what concentrations they must be reduced.

One of the advantages of using a copper fluoride equivalent in diluted form is that if the copper fluoride is largely consumed in the refining reaction it would appear to be feasible to repurify the salt phase containing the copper fluoride and the impurities by fused salt electrolysis in which the residual copper fluoride and then the impurity metal fluorides will decompose preferentially at the electrodes because they are thermodynamically less stable than the salt solvent. A second advantage is that the use of a diluent material may permit suppression of electronic conductivity thought to exist in copper-saturated liquid copper fluoride, which would greatly reduce current efficiency in electrolytic purification of the impurity laden fused salt. A third advantage is that the constituents of the salt phase may be chosen so as to depress the thermodynamic activities of specific impurity fluorides and so drive specific refining reactions further toward completion than otherwise possible. It has been found that as little as 1 mole percent copper fluoride in the electrolyte will be capable of refining liquid copper where the impurity level is low.

In the electrochemical method of performing the fluoride refining reaction an electrolytic cell is used rather than a chemical reactor. The major constituents of the electrolyte should be very stable thermodynamically (for example, $CaF_2$-$MgFB2$), nonvolatile, and liquid at temperatures substantially below the melting point of copper. The electrolyte should also contain a small concentration of copper fluoride. In the electrolytic cell there will be an impure liquid copper anode pool and a pure copper cathode pool. Electrolysis is performed with an applied voltage sufficiently small that the major electrolyte constituents do not take part in either electrode reaction and the impurities are not deposited at the cathodes.

Although any of the aforementioned methods of introducing a copper fluoride equivalent into the molten copper may be used in the process of this invention, for the purposes of the remainder of the discussion in this specification it will be assumed that copper fluoride was introduced as anhydrous copper fluoride.

The stoichiometry of the copper fluoride changes as it becomes saturated with copper metal until it attains the composition range of from about $CuF_{0.90}$ to about $CuF_{1.50}$, depending upon the temperature employed. The copper fluoride is largely immiscible in the liquid copper, and because of its lower density forms a slag or salt phase above the molten metal.

The refining reactions occur because of the favorable thermodynamic properties of copper fluoride as compared with the thermodynamic properties of the impurity element fluorides. More specifically the Gibbs free energy of formation is thought to be substantially less negative than for the formation of the fluorides of the impurity elements.

The following typical reactions are believed to occur spontaneously in the molten copper when copper fluoride is introduced therein.

$CuF_2$+Fe (dissolved in liquid Cu)→$FeF_2$(l)+$Cu°$(l)
$CuF_2$+Ni (dissolved in liquid Cu)→$NiF_2$(l)+$Cu°$(l)
$CuF_2$+Pb (dissolved in liquid Cu)→$PbF_2$(l)+$Cu°$(l)
$CuF_2$2/3Bi (dissolved in liquid Cu)→2/3$BiF_3$(l)+$Cu°$(l)
$CuF_2$+/3As (dissolved in liquid Cu)→$AsF_3(g)$+$Cu°$(l)
$CuF_2$+/3Sb (dissolved in liquid Cu)→2/3$SbF_3(g)$+$Cu°$(l)
$CuF_2$+(dissolved in liquid Cu)→$SnF_2(g)$+$Cu°$(l)

An alternative formalism which can be used in writing the reactions where $CuF_x$ is used is:

$(2/x)CuF_x$+Fe (dissolved in liquid Cu)→$FeF_2$(l)+$2/xCu°$(l)

Information in the literature on standard free energies of formation of inorganic fluorides is neither extensive nor reliable, nor is thermodynamic activity data for the above noted species available except in a few cases, so it is not possible to predict in advance, through routine knowledge of the literature and the state-of-the-art of chemical process metallurgy, that all metallic and nonmetallic impurities can be converted to fluorides by reaction with copper fluoride to an extent which makes these reactions useful for refining copper.

It has been experimentally found that when a charge of impure liquid or molten copper and cupric fluoride contact each other that the metallic impurities in the copper are rapidly and completely transferred to the salt phase. These impurities that have been transferred to the salt phase may be classified into two groups: (1) those impurities whose fluorides are volatile at the temperatures of the reaction and immediately escape as gases from the salt phase (such as arsenic, antimony, and tin) and (2) those impurities which are essentially nonvolatile and tend to remain in the salt phase such as nickel, iron, lead, and bismuth. The significance of this classification is that the impurities forming the volatile fluorides (a) do not accumulate in the salt phase and thus do not lead to the requirement for a salt repurification process, and (b) tend not to require as negative a free energy of reaction with copper fluoride as impurities forming nonvolatile fluorides, because the thermodynamic activities of the volatile impurity fluoride species are suppressed and held to a low level by their evaporation from the salt.

The following examples 2 through 5 illustrate the removal of the metallic impurities from molten copper. In these experi-

TABLE V.—ANALYSES

| | Starting "blister" | Weight percent | | | | | | | |
|---|---|---|---|---|---|---|---|---|---|
| | | Example 2 | | Example 3 | | Example 4 | | Example 5 | |
| | | Metal | Salt | Metal | Salt | Metal | Salt | Metal | Salt |
| Ni | .041 | .00040 | .159 | .00032 | .304 | .00074 | .150 | .00048 | .168 |
| Fe | .011 | <.0001 | .053 | .00034 | .100 | <.0001 | .057 | .00034 | .061 |
| Pb | .019 | <.0001 | .183 | <.0001 | .220 | <.0001 | .115 | <.0001 | .084 |
| Bi | .0016 | .00001 | .0036 | <.00001 | .0028 | <.00001 | .0003 | <.00001 | .0007 |
| As | .061 | <.0002 | <.0001 | <.0002 | .0003 | <.0002 | .0003 | <.0002 | .0003 |
| Sb | .013 | <.0004 | .0003 | <.0003 | .0001 | <.0003 | .0001 | <.0003 | .0002 |
| F | | .0097 | 27.98 | .0084 | 26.92 | .0096 | 27.52 | .0079 | 27.65 |
| Cu | Bal. | Bal. | 70.97 | Bal. | 70.45 | Bal. | 70.87 | Bal. | 71.34 | ments a charge of impure molten copper was allowed to contact copper fluoride at 1,100° C, under an inert atmosphere in a graphite crucible. After sufficient time for reaction the crucible contents were cooled and the products analyzed. Table V below presents impurity analyses of the initial metal and the products of each of the examples. 003000 It is significant that the same degree of metal purification was achieved in these four examples despite a deliberate variation in experimental parameters as shown by table VI:

TABLE VI

| Examples: | 2 | 3 | 4 | 5 |
|---|---|---|---|---|
| Weight of Metal Charge (g.) | 25R | 24.3 | 25.3 | 20.7 |
| Weight Ratio of Metal to $CuF_2$ | 5.15 | 9.72 | 4.96 | 4.93 |
| Rate of heating (hrs. from R.T. to 1,100° C.) | 3.5 | 0.2 | 0.2 | 0.2 |
| Time at temperature (hr.) | 2 | 1.5 | 1.5 | 1.5 |
| Rate of Cooling (min. until metal is solidified) | 13 | ~1 | ~1 | ~1 |
| Crucible Vented | Closed | Closed | Vented | Vented |
| Crucible Agitated | No | No | Yes | Yes |

It is noteworthy that the metal product in the above examples is comparable in purity level to conventional electrolytic cathode grade copper after only a single stage of contact with copper fluoride.

In some cases the initial impurity level of the molten copper may be much higher than in the above examples. For highly contaminated blister or scrap copper, two or more stages of reaction with copper fluoride may be necessary in order to obtain the desired impurity level.

Example 6

This example illustrates equilibrium at high impurity concentrations. The data was obtained by isolation of the two liquids, i.e. the liquid metal phase and the liquid salt phase at 1,091° C. The analyses shown below were confined to the nonvolatile impurities such as nickel, iron, lead and bismuth since these metal impurities tend to accumulate in the salt phase and must eventually be removed by purification. Table VII shows that the ratio of impurity concentration in the salt phase (B) to that in the metal (A) is very high. It can be extrapolated from this data that most impure coppers can be refined by the process of the present invention with no more than two stages of contact by copper fluoride.

TABLE VII

Equilibrium Compositions at High Impurity Level

| | A. Metal Phase | B. Salt Phase | Ratio B/A |
|---|---|---|---|
| | (Analyses in Weight Percent) | | |
| Ni | 0.0074 | 2.30 | 310. |
| Fe | 0.0068 | 1.47 | 216. |
| Pb | 0.0024 | 1.46 | 606. |
| Bi | <0.00002 | 0.693 | >3.5×10⁴ |

An important consideration in the process of copper fluoride refining is the nature of the $CuF_2$–Cu phase diagram, and more specifically the solubility of salt in the metal phase as the process temperature is raised above the monotectic point (the lowest temperature at which the copper metal is liquid). It has been found experimentally that the solubility of salt in the metal phase is extremely small in the temperature range of interest. For example at 1,128° C. the solubility of copper fluoride in molten copper is 522 parts per million by weight. At the monotectic temperature, 1,083° C., the solubility of copper fluoride in molten copper is 105 parts per million by weight. Because of the nature of the experimental method in determining these values they are regarded to be the upper limit of solubility so that the true values will be smaller.

Example 7

This is an example of the use of copper fluoride in diluted form. A charge comprising 20 mole percent copper fluoride, balance $CaF_2$–$MgF_2$ eutectic mixture, was reacted with molten impure copper at 1,114° C., for 2 hours. The results of this experiment are shown in table VIII below.

TABLE VIII

IMPURITY ANALYSES

| | Initial Metal | Product Equilibrium Compositions | |
|---|---|---|---|
| | Impurity Content Weight % | Metal Phase Weight % | Salt Phase Weight % |
| Fe | 0.049 | 0.00026 | 0.046 |
| Ni | 0.051 | 0.00025 | 0.044 |
| Pb | 0.134 | 0.00076 | 0.142 |
| Bi | 0.043 | 0.000083 | 0.036 |
| Sb | 0.041 | 0.00025 | 0.014 |
| As | 0.045 | 0.00020 | 0.0034 |

Example 8

A charge comprising 5 mole percent copper fluoride in a $CaF_2$–MgFB2 eutectic mixture was reacted with molten impure copper at 1,114° C. for 2 hours. The refining results are shown in table IX below.

TABLE IX

IMPURITY ANALYSES

| | Initial Metal | Products Isolated as Liquids | |
|---|---|---|---|
| | Impurity Content Weight % | Metal Phase Weight % | Salt Phase Weight % |
| Fe | 0.049 | 0.00061 | 0.029 |
| Ni | 0.061 | 0.00056 | 0.0012 |
| pb | 0.134 | 0.0009 | 0.17 |
| Bi | 0.043 | 0.0012 | 0.0009 |
| As | 0.045 | 0.0088 | <0.00005 |
| Sb | 0.041 | <0.00025 | 0.0005 |

Example 9

This example shows that a significant amount of refining is possible when the nonvolatile impurity metal content of the copper is much greater than normally found in copper sources. A charge comprising 10 mole percent copper fluoride in a $CaF_2$—$MgF_2$ eutectic mixture was reacted with molten impure copper for 3 hours at 1,114° C.

TABLE X.—IMPURITY ANALYSES

| Initial metal | Impurity content, wt. percent | Analysis of product | | Ratios* | |
|---|---|---|---|---|---|
| | | Metal, wt. percent | Salt, wt. percent | Impurity removal | Salt transfer |
| Fe | 1.0 | .00031 | 1.65 | 3.2×10³ | 5.5×10 |
| Ni | 1.0 | .0015 | 1.70 | 6.7×10 | 1.1×10 |
| Pb | 1.0 | .00037 | 1.53 | 2.7×10³ | 4.1×10 |
| Bi | 1.0 | .00044 | .066 | 2.3×10³ | 1.5×10 |

*See the following ratios:
Impurity removal ratio
= weight percent impurity in initial metal / weight percent impurity in product metal Salt transfer ratio
= weight percent impurity in product salt / weight percent impurity in product metal From observing additional experiments using stable salt solvents as diluents containing from about 1 to 20 or more mole percent of copper fluoride in a salt mixture and various temperatures, time of reaction, types of impurities and concentration of impurities it can be concluded that (a) refining reactions are relatively rapid; (b) 5 mole percent of a copper fluoride in the salt charge is very nearly as effective as 20 mole percent copper fluoride; (c) sulfur and tellurium are not removed by the fluoride refining reaction so that the first step of anionic impurity removal should be employed as part of an overall refining process; and (d) the effect of increased temperature is adverse but not unduly so thus permitting a latitude of at least 50° C. above the melting point of copper in the choice of operating temperature.

The practical utility of a high-temperature metal refining process such as the one described in this application is very much dependent on the availability of suitable materials of construction for containment of metal, salt, and vapors which arise as products or are introduced as reactants. I have found that graphite and carbon are excellent materials for containment, and graphite for electrode leads. As an anode in cathodic electrolysis, the types of consumable carbon electrodes used in aluminum reduction appear to have merit. Depending on the salt composition present, certain oxide and silicate refractories are considered to be adequate. Finally, solidified salt may be employed as an insulating and sealing material, by proper engineering design of heat removal from the apparatus, much as frozen cryolite has proven to be the best insulator in aluminum reduction cells.

The engineering design of chemical reaction vessels for the process will emphasize certain criteria, among which are providing a high ratio of reactive surface to volume, by dispersing metal droplets in the salt phase or salt droplets in the metal phase, or bubbles of reactant vapor in the metal phase or in the salt phase. A second criterion is the provision of a more or less sealed vessel, such that moisture and other hydrogen sources are excluded and oxygen is restricted to low concentrations. While inert gases such as nitrogen and argon are suitable as gas blankets in the apparatus, I believe that less costly protective atmospheres will suffice. Depending on the particular selection of impurity metals present and the fluorine potential in the apparatus, it may suffice to use dried air as a protective atmosphere; alternately dried combustion gases containing no hydrogen may be used, such as a mixture of $CO_2$ and $CO$.

There are two optional sequences in time by which the two steps of the metal refining process of this application may be conducted, and each has its own apparent special advantages. In the first optional method the two steps are conducted separately, with anion impurity removal preceding metal impurity removal. In the second method, the two steps are conducted simultaneously in one electrochemical reactor. This reactor comprises two complete electrolytic cells, having as a common electrode the impure liquid copper which serves as cathode of one cell and anode of the other. It is maintained at an electrical potential intermediate between the end anode, at which $O_2S_2$, $Se_2$, $Te_2$ may be discharging, and the end cathode at which copper metal and/or impurity metals are deposited. It is desirable to keep the two electrolytes physically separated into an anion removal section and a cation removal section.

This invention may be embodied in other forms or carried out in other ways without departing from the spirit or the essential characteristics thereof. The embodiments presented above are therefore to be considered as in all respects illustrative and not restrictive, the scope of the invention being indicated by the appended claims, and all changes which come within the meaning and range of equivalency are intended to be embraced therein.

What is claimed is:

1. The process of removing chalcogens from molten copper comprising making the molten copper the cathode of an operating electrolytic cell containing an electrolyte selected from the group consisting of alkaline earth chlorides, alkaline earth fluorides and mixtures thereof and passing an electric current through the electrolytic cell between said cathode and an anode whereby said chalcogens are transferred from the molten copper.

2. The process of claim 1 wherein the electrolyte consists essentially of from about 0.3 to about 10 weight percent alkali metal halides, the balance of the electrolyte selected from the group consisting of alkaline earth chlorides, alkaline earth fluorides and mixtures thereof.

3. The process of claim 1 wherein the electrolyte is selected from the group consisting of calcium chloride, barium chloride, calcium fluoride, and magnesium chloride.

4. The process of refining copper comprising the steps of
   a. feeding impurity-containing liquid copper to an electrolytic cell containing an electrolyte
   b. passing an electric current between an anode and a cathode through said electrolyte such that the liquid copper is the cathode whereby the anion-forming elements are transferred from the liquid copper cathode to the electrolyte, and
   c. reacting the liquid copper with copper fluoride equivalent to remove the metallic impurities.

5. The process of claim 4 wherein the anion-forming elements transferred from the liquid copper cathode to said electrolyte are oxidized at the anode to the elemental state and discharged from the electrolytic cell as a gas.

6. The process of claim 4 wherein anion-forming elements transferred from the liquid copper cathode react with metallic ions of said electrolyte forming compounds which precipitate in said electrolyte; including the step of periodically removing the precipitated compounds from said electrolyte.

7. The process of claim 4 wherein the anion-forming elements transferred from the liquid copper cathode react with metallic ions of said electrolyte forming compounds soluble in said electrolyte; including the step of purifying said electrolyte by withdrawing a portion of said electrolyte from said cell, cooling said electrolyte to precipitate said compounds, removing said compounds from said electrolyte and returning the purified portion of said electrolyte to said cell.

8. The process of claim 4 wherein the electrolyte is selected from the group consisting of alkaline earth chlorides, alkaline earth fluorides and mixtures thereof.

9. The process of claim 8 wherein the electrolyte consists essentially of from about 0.3 to about 10 weight percent alkali metal halides, the balance of the electrolyte selected from the group consisting of alkaline earth chlorides, alkaline earth fluorides and mixtures thereof.

10. The process of claim 4 wherein the copper fluoride equivalent is selected from the group consisting of cupric fluoride, fluorine gas, fluorocarbon gas mixture, antimony pentafluoride, stannic fluoride and $CuF_x$ where $x$ is from about 0.90 to about 1.50.

11. The process of claim 10 wherein the copper fluoride equivalent is dissolved in a salt solvent selected from the group consisting of alkaline earth fluorides and mixtures thereof.

12. The process of refining copper comprising the steps of:
   a. reacting liquid copper containing impurities with a solution of a reactive metal dissolved in a molten salt to remove the anionic impurities,
   b. feeding the liquid copper to an electrolytic cell such that the liquid copper is the anode, the electrolytic cell containing an electrolyte selected from the group consisting of alkaline earth fluorides and mixtures thereof, the electrolyte containing at least 1 mole percent of a copper fluoride equivalent, and
   c. passing an electric current through the cell between the liquid copper anode and a cathode whereby the metallic impurities are transferred from the liquid copper anode to the electrolyte.

13. The process of claim 12 wherein the copper fluoride equivalent is selected from the group consisting of cupric fluoride, fluorine gas, fluorocarbon gas mixture, antimony pentafluoride, stannic fluoride and $CuF_x$ where $x$ is from about 0.90 to about 1.50.

14. The process of claim 13 wherein the electrolyte is a $CaF_2$—$MgFB2$ eutectic mixture.

15. The process of refining copper comprising the steps of
   a. feeding impurity containing liquid copper to a first electrolytic cell containing a first electrolyte
   b. passing an electric current between an anode and a cathode through said first electrolyte such that the liquid copper is the cathode whereby the anion-forming elements are transferred from the liquid copper cathode to said first electrolyte,
   c. feeding the anion-free liquid copper to a second electrolytic cell such that the liquid copper is the anode, said second electrolytic cell containing a second electrolyte selected from the group consisting of alkaline earth fluorides and mixtures thereof, said second electrolyte containing at least 1 mole percent of a copper fluoride equivalent and
   d. passing an electric current between the liquid copper anode and a cathode through said second electrolyte whereby the metallic impurities are transferred from the liquid copper anode to said second electrolyte.

16. The process of claim 15 wherein anion-forming elements transferred from the liquid copper cathode to said first electrolyte are oxidized at the anode to the elemental state and discharged from said first electrolytic cell as a gas.

17. The process of claim 15 wherein anion-forming elements transferred from the liquid copper cathode react with metallic ions of said first electrolyte forming compounds which precipitate in said first electrolyte; including the step of periodically removing the precipitate compounds from said first electrolyte.

18. The process of claim 15 wherein the anion-forming elements transferred from the liquid copper cathode react with metallic ions of said first electrolyte forming compounds in said first electrolyte; including the step of purifying said first electrolyte by withdrawing a portion of said first electrolyte from said first cell, cooling the portion of said first electrolyte to precipitate the compounds, removing the compounds from said first electrolyte and returning the purified portion of said first electrolyte to said first cell.

19. The process of claim 15 wherein said first electrolyte is selected from the group consisting of alkaline earth chlorides, alkaline earth fluorides, and mixtures thereof.

20. The process of claim 19 wherein said first electrolyte consists essentially of from about 0.3 to about 10 weight percent alkali metal halides, the balance of the electrolyte is selected from the group consisting of alkaline earth chlorides, alkaline earth fluorides and mixtures thereof.

21. The process of claim 15 wherein the copper fluoride equivalent is selected from the group consisting of cupric fluoride, fluorine gas, fluorocarbon gas mixture, antimony pentafluoride, stannic fluoride and $CuF_x$ where $x$ is from about 0.90 to about 1.50.

22. The process of claim 21 wherein said second electrolyte is a $CaF_2$—$MgF_2$ eutectic mixture.

UNITED STATES PATENT OFFICE
CERTIFICATE OF CORRECTION

Patent No. 3,616,340          Dated October 26, 1971

Inventor(s) Philip E. Lapat

It is certified that error appears in the above-identified patent and that said Letters Patent are hereby corrected as shown below:

Column 4, line 37, in Table III, "0.0341" should read -- 0.034 --. Column 7, line 34, cancel "$CuF_2$" and insert -- conveniently --; line 45, "$a_{CuF}$" should read -- $a_{CuF_2}$ --; line 63, "$a_{CuF}$" should read -- $a_{CuF_x}$ --. Column 9, line 51, "$CaF_2$-MgFB2)" should read -- $CaF_2 - MgF_2$) --. Column 11, line 6, delete "003000" and start a new paragraph, "It is significant ...". Column 12, line 31, "$CaF_2$-M$_g$FB2" should read -- $CaF_2$-$MgF_2$ --; lines 44-47, in Table IX, first two columns should read as follows:

-- Impurity Content
Weight %

| | |
|---|---|
| Fe | 0.049 |
| Ni | .061 |
| Pb | .134 |
| Bi | .043 |
| As | .045 |
| Sb | .041 -- ; |

Column 12, lines 66-69, in Table X last two columns should read as follows:

| -- Impurity Removal | Salt Transfer |
|---|---|
| $3.2 \times 10^3$ | $5.5 \times 10^3$ |
| $6.7 \times 10^2$ | $1.1 \times 10^3$ |
| $2.7 \times 10^3$ | $4.1 \times 10^3$ |
| $2.3 \times 10^3$ | $1.5 \times 10^3$ -- . |

Column 15, line 2, (claim 14), "$CaF_2$-MgFB2" should read -- $CaF_2$-$MgF_2$ --.

Signed and sealed this 1st day of May 1973.

(SEAL)
Attest:

EDWARD M. FLETCHER, JR.
Attesting Officer

ROBERT GOTTSCHALK
Commissioner of Patents